United States Patent
Okawa

(10) Patent No.: US 7,150,547 B2
(45) Date of Patent: Dec. 19, 2006

(54) TURN SIGNAL AND STEERING RESPONSIVE ADJUSTABLE LIGHTING APPARATUS FOR VEHICLE

(75) Inventor: Masao Okawa, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 248 days.

(21) Appl. No.: 10/835,803

(22) Filed: Apr. 29, 2004

(65) Prior Publication Data
US 2004/0264209 A1 Dec. 30, 2004

(30) Foreign Application Priority Data
May 9, 2003 (JP) ............ P.2003-131027

(51) Int. Cl.
*B60Q 1/12* (2006.01)
(52) U.S. Cl. ............ 362/465; 362/523; 315/81; 307/10.8
(58) Field of Classification Search ........ 362/465, 362/467, 526; 315/81, 82; 307/10.8
See application file for complete search history.

(56) References Cited

U.S. PATENT DOCUMENTS

| 4,733,333 A | 3/1988 | Shibata et al. | |
| 5,526,242 A * | 6/1996 | Takahashi et al. | 362/467 |
| 6,293,686 B1 | 9/2001 | Hayami et al. | |
| 6,547,424 B1 * | 4/2003 | Hasumi et al. | 362/465 |
| 6,648,494 B1 | 11/2003 | Sugimoto et al. | |
| 6,752,508 B1 * | 6/2004 | Kobayashi | 362/465 |
| 6,805,472 B1 * | 10/2004 | Fukawa | 362/465 |
| 6,837,601 B1 * | 1/2005 | Tatsukawa | 362/465 |

FOREIGN PATENT DOCUMENTS

DE 199 61 913 6/2000

* cited by examiner

Primary Examiner—Thomas M. Sember
Assistant Examiner—Ismael Negron
(74) Attorney, Agent, or Firm—Fish & Richardson P.C.

(57) ABSTRACT

An apparatus for illuminating an area in front of a vehicle, including a lamp and means for deflecting a radiation direction of the lamp in response to a steering action, except when the steering action is performed in a direction opposite to a direction indicated by a turn signal from a turn signal switch. When the direction of the turn signal does not match the steering direction, the radiation direction of the lamp is maintained in the straight traveling direction of the vehicle until a predetermined period of time has passed. The exception might not be realized if the vehicle is traveling above a predetermined speed.

5 Claims, 8 Drawing Sheets

1A  STEERING SENSOR
1B  VEHICLE SPEED SENSOR
1C  TURN SIGNAL SWITCH
3R, 3L  SWIVEL LAMP

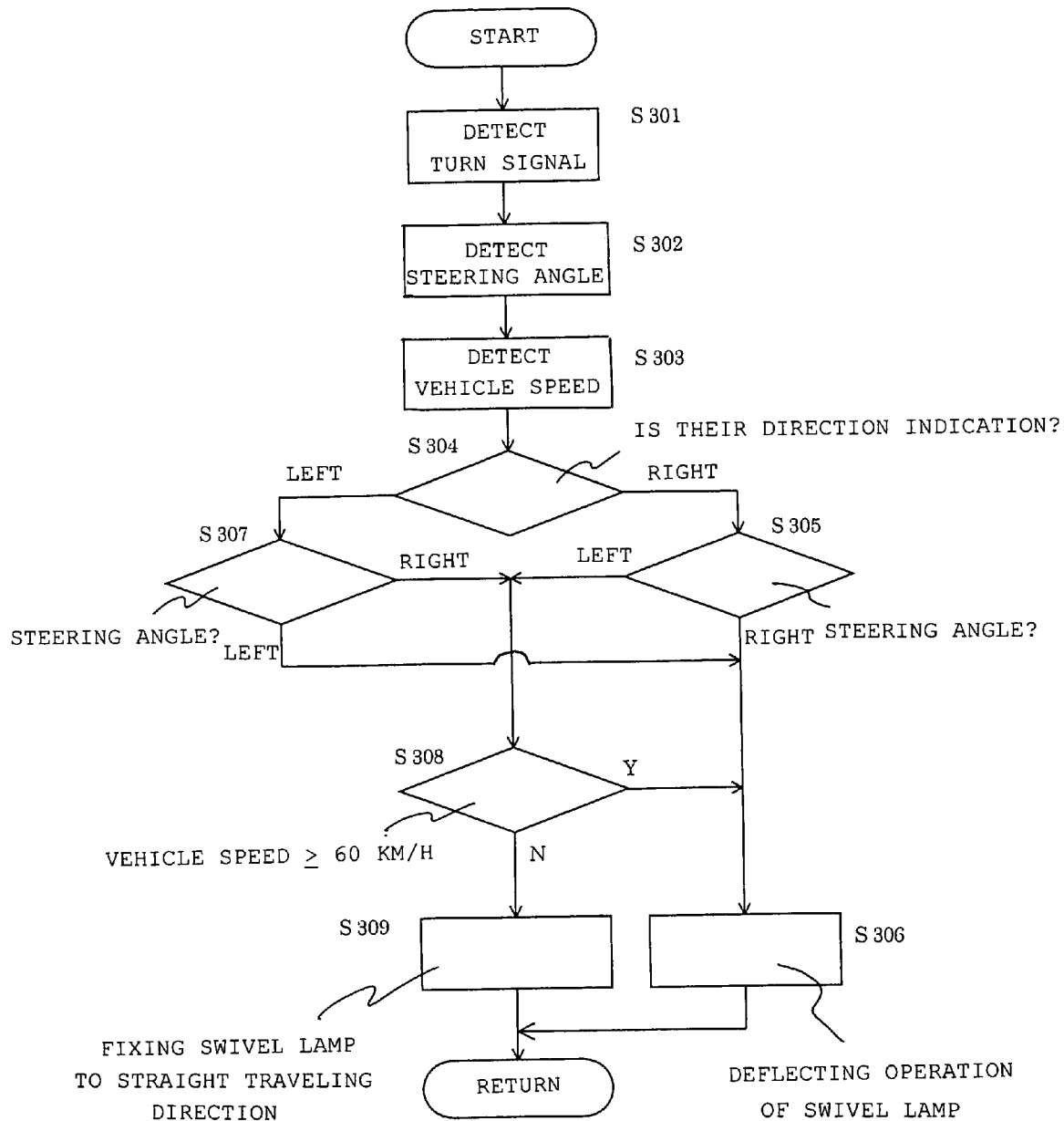

TURN SIGNAL AND STEERING RESPONSIVE ADJUSTABLE LIGHTING APPARATUS FOR VEHICLE

TECHNICAL FIELD

The present disclosure relates to a vehicular lighting apparatus which is applied to a head lamp apparatus of the vehicle such as a motor vehicle or the like. In particular, the disclosure relates to a vehicular lighting apparatus which is provided with light distribution control means for changing a radiation direction and a range of radiation in accordance with a traveling condition, for example, an adaptive type lighting system or adaptive front-lighting system ("AFS").

BACKGROUND

Japanese Unexamined Patent Publication No. 2002-160581, which is assigned to the applicant of the present invention, discloses an AFS for improving a driving safety of a motor vehicle. The AFS is shown schematically in FIG. 1. A motor vehicle (CAR) includes a steering sensor 1A for detecting a steering angle in the steering apparatus and a vehicle speed sensor 1B for detecting a vehicle speed. Output signals from the sensors 1A and 1B are provided as input signals to an electronic control unit ("ECU") 2. Headlamps 3 (e.g., swivel lamps 3R and 3L) are disposed in the right and left sides of a front portion of the motor vehicle. The ECU 2 deflection controls a range of radiation of the headlamps 3, for example, by controlling the horizontal direction based on the received input signals so as to change the light distribution characteristics.

According to the AFS, when the motor vehicle travels on a curved road, it is possible to illuminate a front of the curve by controlling the radiation direction of the swivel lamps in accordance with the steering angle of the motor vehicle, and it is effective for improving the driving safety.

In the AFS mentioned above, when the deflection control operates the right and left swivel lamps based only on the steering angle, certain problems may arise. Conventional attempts to address those problems have included the following. For example, when the motor vehicle turns to the left in a narrow intersection, a steering operation is performed to move the motor vehicle forward at an acute angle with respect to the road ahead of the vehicle after making the turn by temporarily turning the steering wheel to the right to move the motor vehicle outward toward the right and, thereafter, turning the steering wheel leftward. When deflecting the swivel lamp in accordance with the steering angle, the swivel lamp is deflected toward the right by the first rightward steering. Accordingly, after the left turn, the road ahead of the vehicle cannot be illuminated until the steering wheel is turned leftward, resulting in an unsafe driving condition.

Further, just after turning to the right or the left, the steering wheel remains turned to the right or the left. Accordingly, if the swivel lamp remains deflected to the right or the left until the steering wheel is returned, it is impossible to properly illuminate the front of the vehicle in the straight traveling direction ahead of the curve just after the right turn or the left turn. In some cases, an unsafe driving condition may occur.

When changing lanes while the motor vehicle is traveling on an express highway, the steering operation is executed by issuing a turn signal and subsequently turning in the direction thereof. If the swivel lamp is deflected only in accordance with the steering operation, illuminating the front of the vehicle in the straight traveling direction may be insufficient, for example, when a steering operation is performed to turn the vehicle in the direction opposite the turn signal, such as in an emergency or in order to avoid a danger. In such situations, there is a risk that an unsafe driving condition may result.

The present invention may provide a vehicular lightening apparatus which can achieve suitable lighting by limiting deflection of the lamp, while the vehicle is traveling, when it is not desirable to deflect in accordance with a steering operation.

SUMMARY

In accordance with the present invention, there is provided a vehicular lightening apparatus which can deflect a radiation direction of a lamp provided in a front portion of a vehicle to the right and the left in accordance with a steering operation of a steering apparatus. The deflecting operation of the lamps is stopped if the steering operation is executed in a direction opposite to a direction indicated by a turn signal when the turn signal is input from a turn signal switch.

In accordance with a first aspect of the present invention, the deflecting direction of the lamp may be fixed in a straight traveling direction of the vehicle if the turn signal indicates the opposite direction to the opposite lane. In accordance with a second aspect of the present invention, the deflecting direction of the lamp may be fixed in the straight traveling direction of the vehicle until a predetermined time has passed or the vehicle travels for a predetermined distance after the direction indication provided by the turn signal is cancelled by a steering operation in the opposite direction. In accordance with a third aspect of the present invention, the deflecting direction of the lamp may be fixed in the straight traveling direction of the vehicle if the vehicle travels at a speed lower than a predetermined speed.

In situations where it is not preferable to deflect the lamp, illumination that is effective for traffic safety may be achieved by fixing the deflecting direction of the lamp in the straight traveling direction of the vehicle. In other words, in accordance with the first aspect, it is possible to illuminate the front of the vehicle in the actual traveling direction when the vehicle turns to the left or the right, regardless of the direction of the turn signal. The second aspect may be advantageous for proper illumination in front of the vehicle in the traveling direction just after turning to the left or the right. In accordance with the third aspect, it is possible to properly illuminate in front of the vehicle in the traveling direction when changing lanes while the vehicle is traveling at a high speed or a low speed.

Other features and advantages may be apparent from the following detailed description, the accompanying drawings and the claims.

BRIEF DESCRIPTION OF THE DRAWINGS

FIG. 8 is a flow chart for explaining a deflecting operation in accordance with a third embodiment.

DETAILED DESCRIPTION

Figure 2:
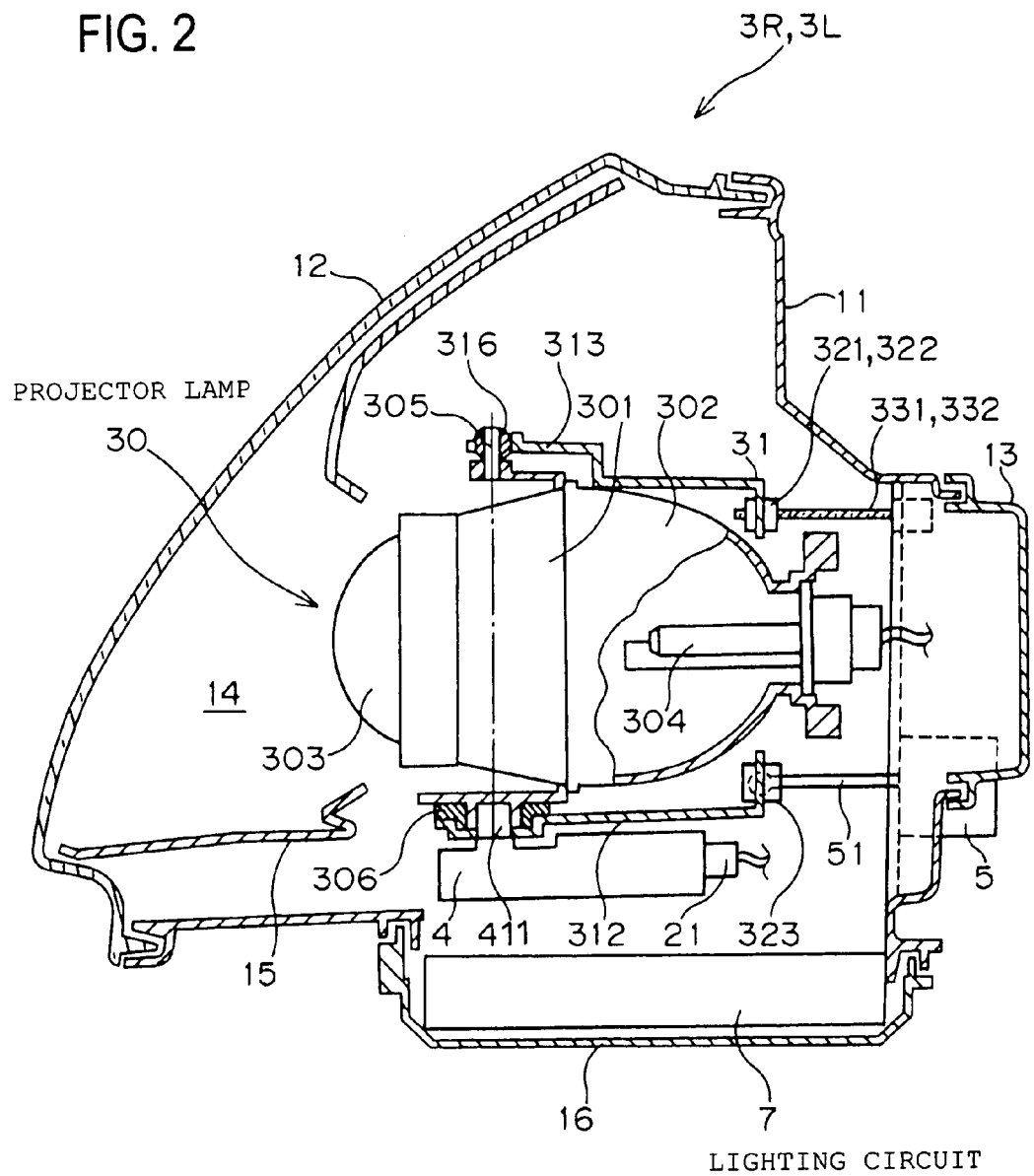
FIG. 2 is a vertical cross section of a swivel lamp.
Figure 3:
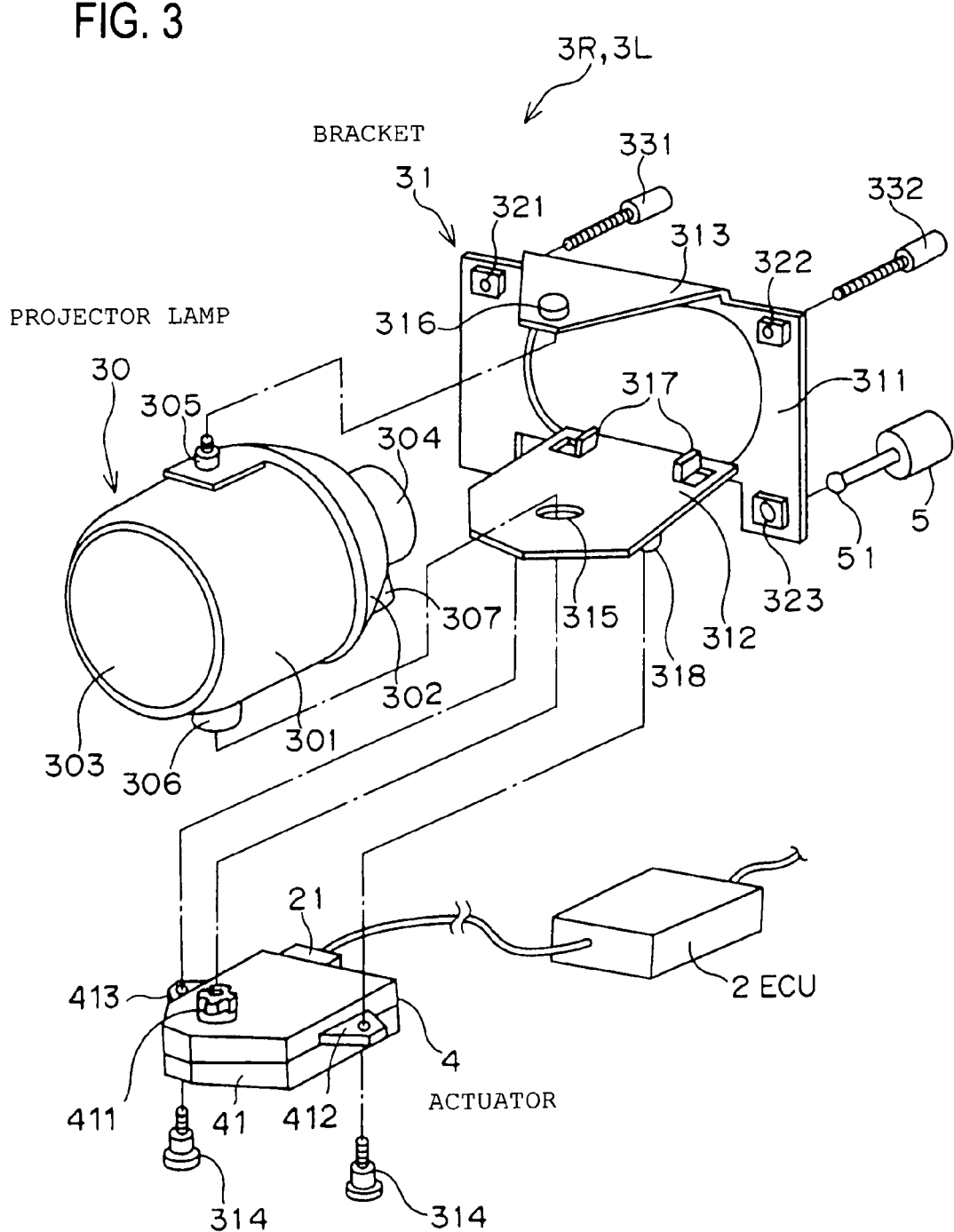
FIG. 3 is an exploded perspective view of a main portion of an internal structure of the swivel lamp.

Next, embodiments according to the present invention are described with reference to the accompanying drawings. FIG. 2 is a vertical cross sectional view of an internal structure of a swivel lamp in which a radiation direction can be deflected to the right and the left in the structural elements of the AFS described in FIG. 1. FIG. 3 is a partially exploded perspective view of a main portion thereof. A lens 12 is attached to a front opening of a lamp body 11, and a rear cover 13 is attached to a rear opening thereof, thus forming a lamp chamber 14. A projector lamp 30 is arranged within the lamp chamber 14. The projector lamp 30 includes a sleeve 301, a reflector 302, a lens 303 and an integrally formed light source 304. Those features are known in the field and, therefore, a detailed description of those is omitted. However, in this case, the lamp using a discharge bulb is employed as the light source 304. The projector lamp 30 is supported by a substantially U-shaped bracket 31. Further, an extension 15 is arranged in the periphery of the projector lamp 30 within the lamp body 11 so as to prevent an inner portion from being exposed through the lens 12. A lighting circuit 7 for illuminating the discharge bulb of the projector lamp 30 is installed utilizing a lower cover 16 attached to a bottom surface opening of the lamp body 11.

The projector lamp 30 is supported in a state in which the projector lamp 30 is held between a lower plate 312 and an upper plate 313 which are substantially perpendicularly bent from a vertical plate 311 of the bracket 31. An actuator 4 is fixed to a lower side of the lower plate 312 by a screw 314, and a rotating output shaft 411 of the actuator 4 is protruded to an upper side through an axial hole 315 opened on the lower plate 312. The screw 314 is screwed with a boss 318 protruding at a lower surface of the lower plate 312. Further, a shaft portion 305 provided on an upper surface of the projector lamp 30 is fitted to a bearing 316 provided in the upper plate 313, and a connection portion 306 provided in the lower surface of the projector lamp 30 is fitted to the rotating output shaft 411 of the actuator 4, whereby the projector lamp 30 can rotate in a lateral direction with respect to the bracket 31, and is moved in a horizontal direction by an operation of the actuator 4 as mentioned above integrally with the rotating output shaft 411.

In the bracket 31, aiming nuts 321 and 322 are integrally attached to respective upper portions of left and right sides as seen from a front side. A leveling bearing 323 is integrally attached to a lower portion in a right side. A horizontal aiming screw 331 and a vertical aiming screw 332 supported by the lamp body 11 so as to freely rotate axially are screwed therewith respectively, and a leveling ball 51 of a leveling mechanism 5 is fitted thereto. Further, the bracket 31 can be rotated in a lateral direction and a vertical direction by axially rotating the horizontal aiming screw 331 and the vertical aiming screw 332. Further, the bracket 31 can be rotated in a vertical direction by longitudinally moving the leveling ball 51 in an axial direction by the leveling mechanism 5. Accordingly, it is possible to adjust an optical axis of the projector lamp 30 in a lateral direction and a vertical direction and to adjust the optical axis of the projector lamp in the vertical direction corresponding to a leveling state in accordance with a change in height of the motor vehicle. A protrusion 307 protrudes from a lower surface of a reflector 302 in the projector lamp 30, and a pair of stoppers 317 are formed in a cut-up manner at right and left positions of the lower plate 312 of the bracket 31 opposing thereto. The protrusion 307 is brought into contact with a stopper 317 corresponding to the rotation of the projector lamp 30 to control a rotation range of the projector lamp 30.

The actuator 4 is provided with a case 41 which is shaped similar to a pentagon. Supporting pieces 412 and 413 are formed in side surfaces of the case 41 and are used for fixing the case 31 to the boss 318 of the bracket 31 by the screw 314. A rotating output shaft 411 having a spline structure protrudes from an upper surface of the case 41 and is connected to the connection portion 306 in the bottom surface of the projector lamp 30. The rotating output shaft 411 is driven to reciprocate and rotate within a required rotation angle range by a motor 42 within the actuator 4. Further, a connector (not shown) is arranged in a back surface of the case 41, and an external connector 21 connected to the ECU 2 is fitted thereto.

Figure 4:
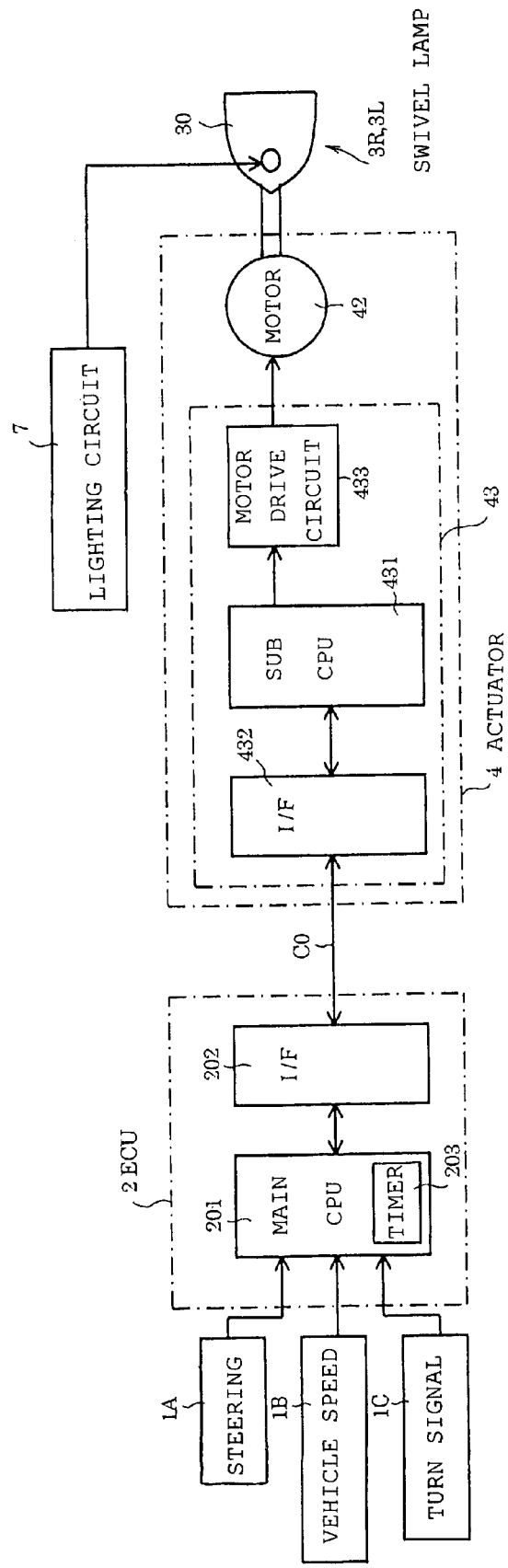
FIG. 4 is a block circuit diagram showing a circuit structure of the AFS.

FIG. 4 is a block circuit diagram showing an electric circuit structure of the lightening apparatus including the ECU 2 and the actuator 4. The actuator 4 is equipped in the right and left swivel lamps 3R and 3L of the motor vehicle, and is adapted to perform two-way communication with the ECU 2. The ECU 2 is provided with a main CPU 201 which serves as a main control circuit to execute a process with a predetermined algorithm on the basis of the steering angle detected by the steering sensor 1A and the vehicle speed detected by the vehicle speed sensor 1B so as to output a control signal C0. The ECU 2 also includes an interface ("I/F") circuit 202 for inputting and outputting the control signal C0 between the main CPU 201 and the actuator 4. In this case, the control signal C0 is a lateral deflection angle signal for controlling a deflection angle of an optical axis of the swivel lamps 3R and 3L with respect to the actuator 4.

A sub-control circuit 43 structured in the actuator 4 for each of the right and left swivel lamps 3R and 3L of the motor vehicle is provided with a sub-CPU 431, an I/F circuit 432 for inputting and outputting a signal with respect to the ECU 2, and a motor drive circuit 433 for driving rotation of a brushless motor 42. The brushless motor, which is installed within the case 41 of the actuator, serves as rotation driving means and corresponds to a driving source for driving the rotating output shaft 411. The sub-CPU 431 controls the motor drive circuit 433 on the basis of the control signal C0 which is input from the ECU 2 through the I/F circuit 432, and can control the deflection angle of the projector lamp 30 by driving the motor 42.

Figure 1:
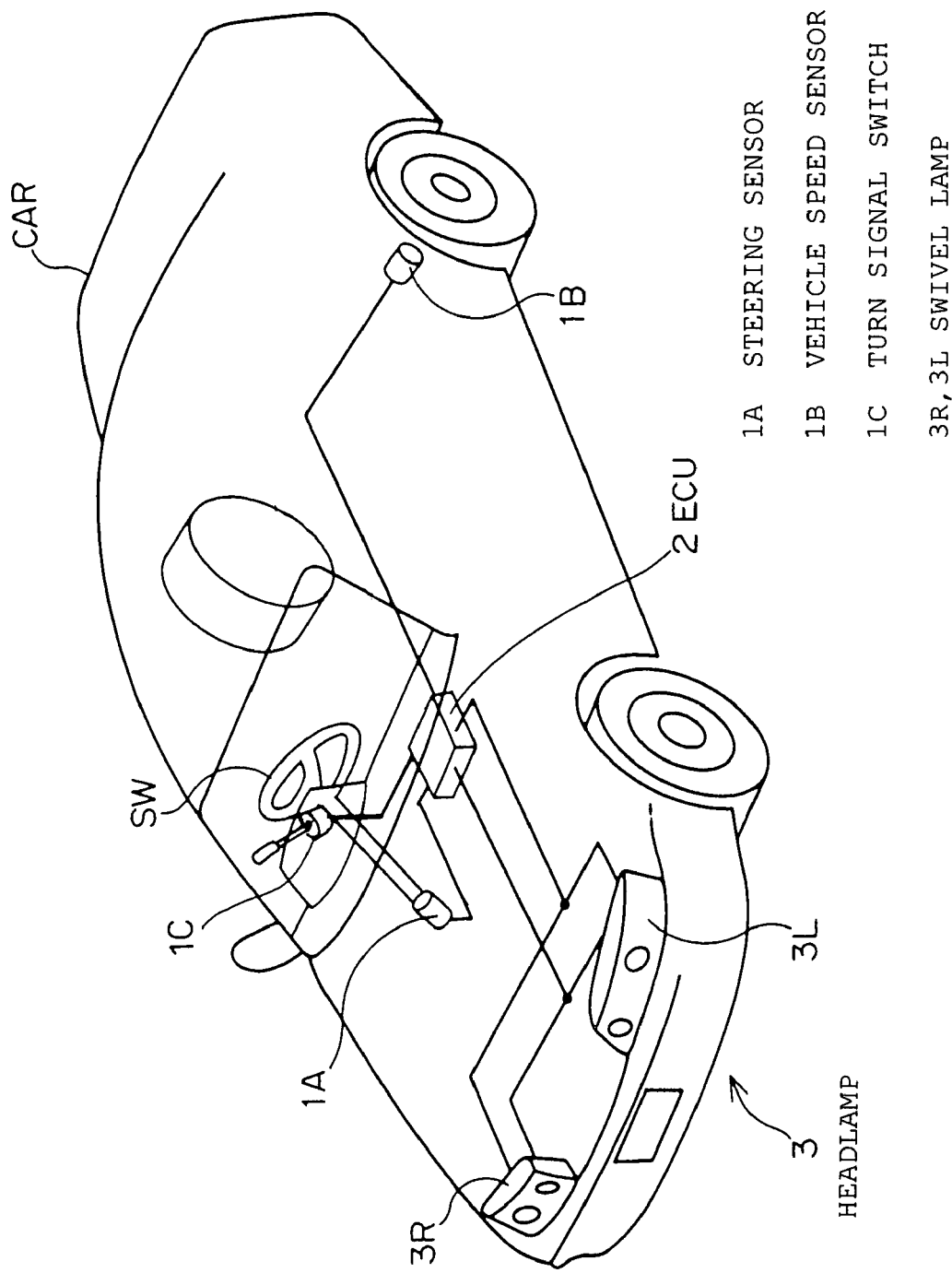
FIG. 1 is a view showing a conceptual structure of an AFS.

Further, as shown in FIG. 1, a turn signal, which is generated when a turn signal switch 1C in a driver's seat of a motor vehicle CAR is operated, is input to the ECU. Further, a timer 203 is installed in the main CPU 201 of the ECU 2, and a preset short time, for example one to two seconds, is clocked by the timer 203.

In accordance with the structure mentioned above, a rotation angle of a steering wheel SW, that is, a signal of a steering angle of the motor vehicle, and a signal of a vehicle speed of the motor vehicle are detected, respectively, from the steering sensor 1A in the motor vehicle and are input to the ECU 2. The ECU 2 performs an operation at the main CPU 201 on the basis of the received input detection signals, and calculates the lateral deflection angle signal C0 of the projector lamp 30 in the swivel lamps 3R and 3L of the motor vehicle so as to input to the respective actuators 4 of both the swivel lamps 3R and 3L. The-sub CPU 431 performs an operation in the actuator 4 on the basis of the input lateral deflection angle signal C0, and calculates a signal corresponding to the lateral deflection angle signal C0 so as to output to the motor drive circuit 433 and drive the rotation of the motor 42. The rotation driving force of the motor 42 is decelerated and transmitted to the rotating output shaft 411, the projector lamp 30 (connected to the rotating output shaft 411) is moved in a horizontal direction, and the radiation direction (the direction of optical axis) of the swivel lamps 3R and 3L is deflected laterally. In this case, a deflection angle of the projector lamp 30 is detected by a rotation angle sensor (not shown) and is fed back to the sub-CPU 431. Thus, it is possible to control the deflection angle corresponding to the deflection angle signal C0.

Figure 5:
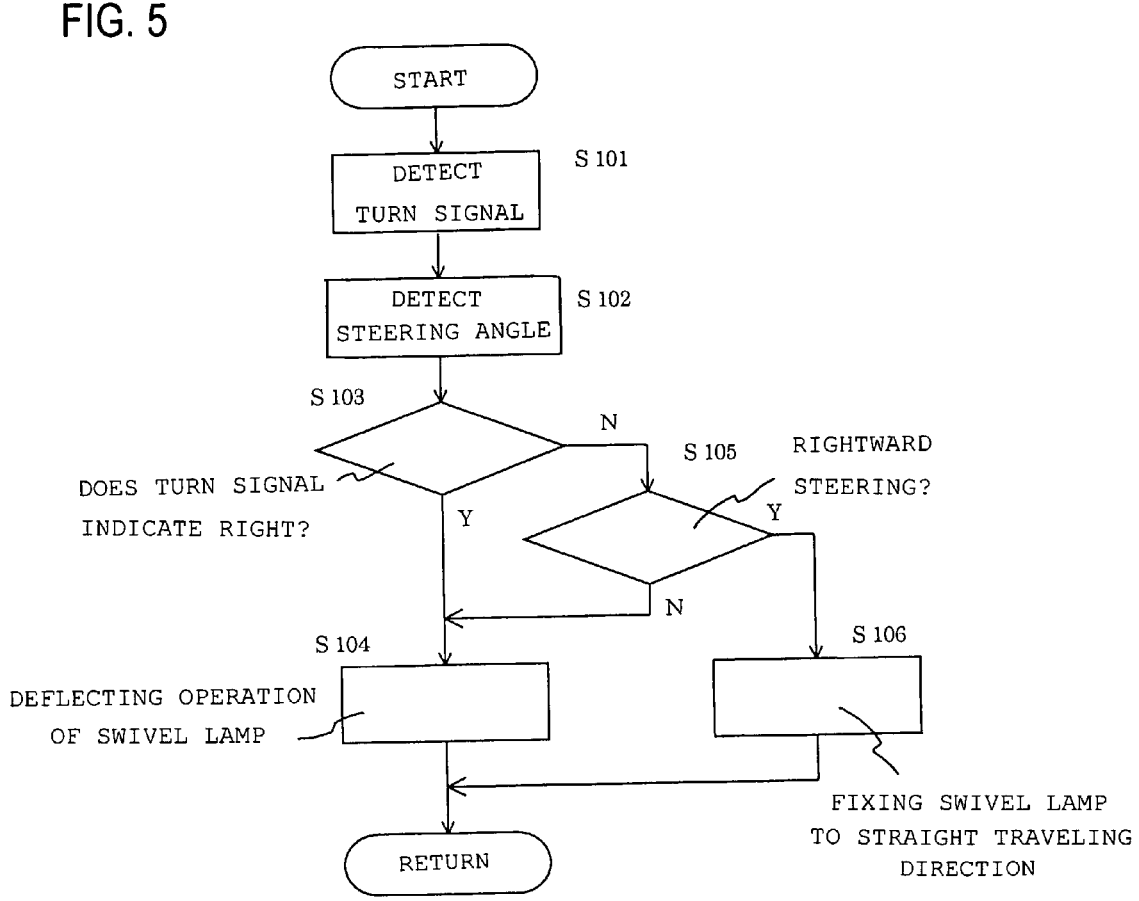
FIG. 5 is a flow chart for explaining a deflecting operation in accordance with a first embodiment.

FIG. 5 is a flow chart for a deflecting operation in accordance with a first embodiment of the present invention on the basis of the AFS mentioned above, and shows an example for the situation when the motor vehicle turns to the left or the right toward a narrow road. First, if the turn signal is input from the turn signal switch, the turn signal is detected (S101). Next, the steering angle is detected based on the output of the steering sensor 1A (S102). Next, the deflection operation of the swivel lamp 3 is executed based on the direction of the turn signal and the steering direction. In other words, it is determined whether the turn signal indicates the right direction or the left direction (S103). If the turn signal indicates the right direction, the swivel lamp 3 is deflected in accordance with the steering angle as explained above for the rightward steering and the leftward steering (S104). If the turn signal indicates the left direction in the step S103, it is determined whether the steering operation is the rightward steering or the leftward steering (S105). If it is determined that the steering operation is the leftward steering, the swivel lamp 3 is deflected in accordance with the steering angle in the same manner (S104). On the other hand, if the steering operation is the rightward steering in step S105, the deflecting operation stops the swivel lamp 3, and fixes the lighting direction of the swivel lamp 3 in the straight traveling direction of the vehicle (S106).

Figure 6:
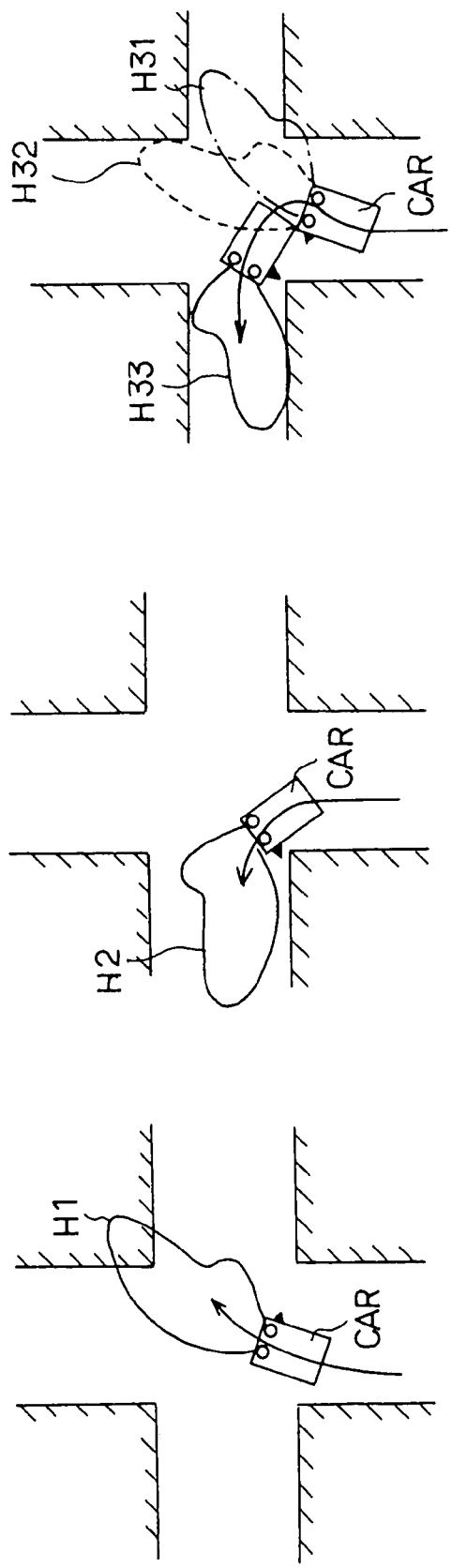
FIG. 6 is a view schematically showing a light distribution pattern corresponding to the first embodiment.

FIG. 6 is a schematic view of a light distribution pattern showing the deflecting operation in the first embodiment. As shown in FIG. 6A, if the turn signal of the motor vehicle (CAR) indicates the right direction, the turn signal indicates the side of the opposite lane in Japan employing the left-hand traffic, and the vehicle can turn to the left without temporarily turning the steering wheel to the left while turning to the right. Accordingly, it is proper to illuminate the right direction by deflecting the swivel lamp as shown by a solid line H1 in accordance with the steering angle. On the other hand, as shown in FIG. 6B, when the leftward steering operation is performed while the turn signal indicates the left direction, the vehicle immediately turns to the left. Accordingly, it is proper to illuminate the left direction by deflecting the swivel lamp as shown by a solid line H2 in accordance with the steering angle. Further, as shown in FIG. 6C, when rightward steering is performed while the turn signal indicates the left direction—that is, in the case that the motor vehicle CAR is temporarily turned outward to the right direction while turning to the left toward the narrow road—the left direction in front of the vehicle in the traveling direction becomes dark by deflecting the swivel lamp to the right direction as shown by a chain line H31 in accordance with the steering angle. Accordingly, in this case, the deflecting operation of the swivel lamp is stopped, and the state of illuminating in front of the motor vehicle in the traveling direction is kept as shown by a broken line H32. Further, when the leftward steering operation subsequently is performed to turn the vehicle to the left, the swivel lamp is deflected to the left direction as shown by a solid line H33. Accordingly, it is possible to illuminate the left direction properly. Therefore, even when the rightward steering operation is performed while turning to the left, it is possible to illuminate safely.

Figure 7:
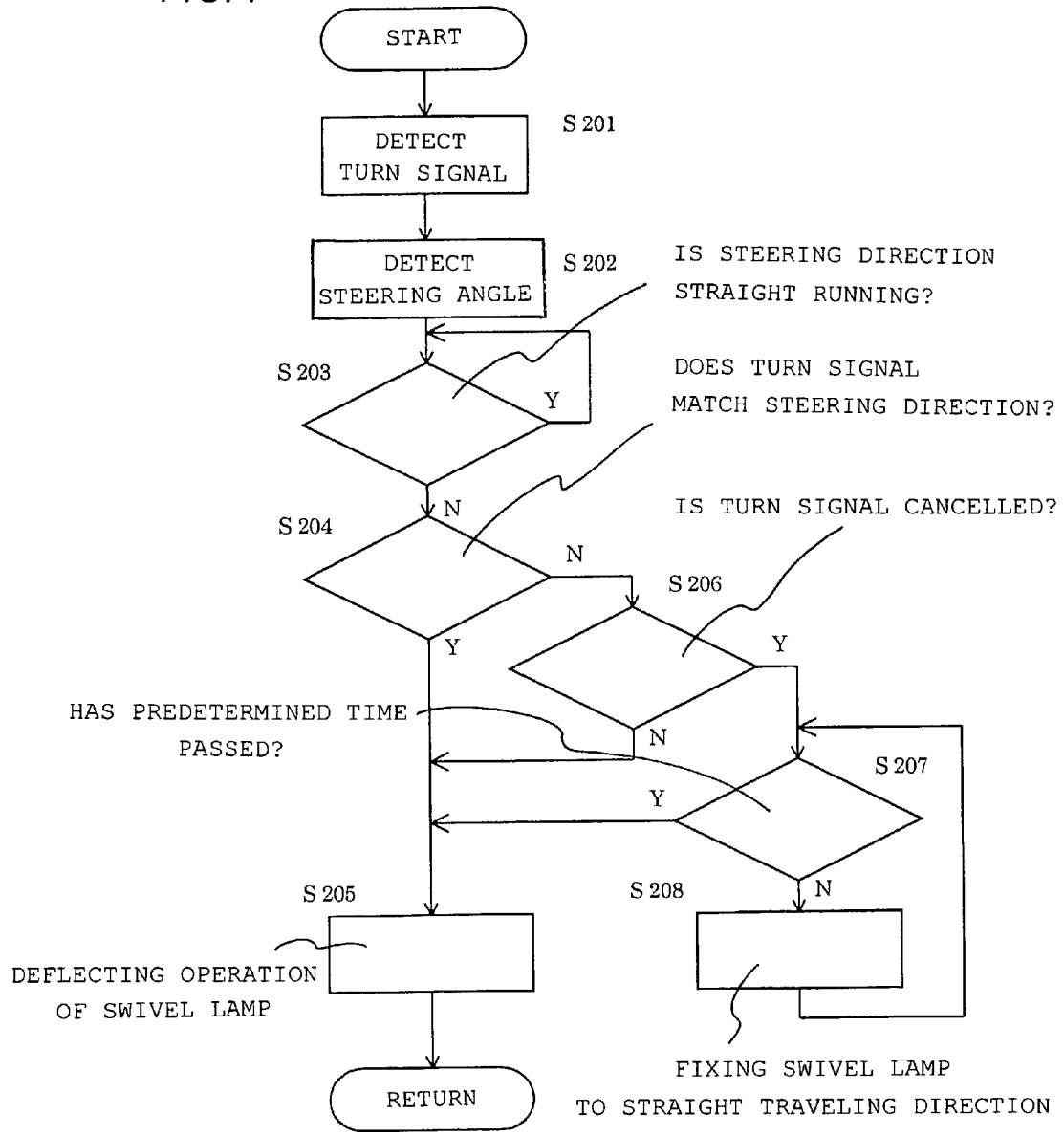
FIG. 7 is a flow chart for explaining a deflecting operation in accordance with a second embodiment.

FIG. 7 is a flow chart for a deflecting operation in accordance with a second embodiment, and shows an example in which the swivel lamp is prevented from being deflected against the driver's will when the motor vehicle turns to the right or the left or changes lanes. First, when the turn signal is input from the turn signal switch, the turn signal is detected (S201). Next, the steering angle is detected based on the output of the steering sensor 1A (S202). Next, if the steering direction is changed from the straight traveling state to rightward or leftward turning (S203), the turn signal is compared with the steering direction (S204), and the swivel lamp is deflected in accordance with the steering angle if turn signal and steering direction match each other (S205). If the turn signal does not match the steering direction, it is determined whether or not the turn signal is cancelled (S206), and the deflecting operation is maintained until the turn signal is cancelled, and a previously set predetermined duration is measured by the built-in timer 203 in the ECU 2 (S207). The predetermined duration is set to the amount of time required for executing the normal operation when the motor vehicle turns to the right, turns to the left and changes lanes. Further, the deflecting operation of the swivel lamp 3 is stopped to fix the lighting direction in the straight traveling direction, thereby maintaining the state in which the straight traveling direction of the motor vehicle is illuminated (S208). After the predetermined amount of time has passed, the swivel lamp 3 is deflected in accordance with the steering angle (S205).

In accordance with the second embodiment, the turn signal may be cancelled based on the operation in steps S204 and S206 by being steered in the opposite direction for some reason or other after outputting the turn signal so as to turn to the right, turn to the left or change lanes from the straight traveling state of the motor vehicle. In this case, the canceling operation is against the will, and the steering operation is turned back to the straight traveling direction from the opposite direction for a comparatively short predetermined time. Accordingly, the swivel lamp 3 is deflected in the opposite direction in accordance with the steering operation, and is fixed in the straight traveling direction for a predetermined time to prevent the original traveling direction from becoming dark. Therefore, when steering is turned back to the straight traveling direction within the predetermined time, the swivel lamp 3 has already illuminated the straight traveling direction, so that it is possible to illuminate properly in front of the motor vehicle in the traveling direction. If the steering operation is in the opposite direction even after the predetermined time has passed, it is determined that the motor vehicle is going to travel in the opposite direction to the turn signal. Accordingly, the direction indication provided by the turn signal is cancelled, and the deflecting operation is performed in the steering direction based on the operation in the step S205.

FIG. 8 is a flow chart for a deflecting operation in accordance with a third embodiment, and shows an example of the motor vehicle changing lanes on an express highway or the like. First, when the turn signal is input from the turn signal switch, the turn signal is detected (S301). Next, the steering angle is detected based on the output of the steering sensor 1A (S302). Further, the vehicle speed is detected from the vehicle speed sensor (S303). Further, it is determined whether the turn signal indicates the left direction or the right direction (S304). The steering angle is determined if the turn signal indicates the right direction (S305), and the swivel lamp is deflected in accordance with the steering angle when the steering direction is the rightward steering (S306). The steering angle is determined if the turn signal indicates the right direction in the step S304 (S307), and the swivel lamp 3 deflects in accordance with the steering angle when the steering direction is the leftward steering (S306). On the other hand, if the steering direction is the leftward steering in the step S305 (that is, if the turn signal indicates the right direction and the leftward steering is achieved) or in the case that the steering direction is the rightward steering in the step S307 (that is, if the turn signal indicates the left direction and the rightward steering is achieved), the vehicle speed (S308) is determined. If the vehicle speed is less than the predetermined speed, for example, a speed lower than sixty Km/h, the step fixes the lighting direction of the swivel lamp 3 in the straight traveling direction (S309). Further, if the vehicle speed is equal to or higher than he predetermined speed (e.g., sixty Km/h), the swivel lamp 3 is deflected in accordance with the steering angle.

In accordance with the third embodiment, if the motor vehicle travels at a speed lower than the predetermined speed, it is possible to illuminate in front of the vehicle in the traveling direction while turning to the right or turning to the left in the same manner as the first embodiment. On the other hand, at a speed equal to or higher than the predetermined speed, the turn signal while changing lanes is output, and when the steering operation in the opposite direction to the direction of the turn signal is performed, it is determined that the intended lane change is suddenly cancelled due to an emergency or the like, so that an area in front of the vehicle in the traveling direction of the current traveling lane is illuminated. Because the steering angle is frequently small in the high speed traveling time, the lighting direction is close to the straight traveling direction even when the swivel lamp 3 is deflected in accordance with the steering angle.

The foregoing description for each of the embodiments assumes left-hand traffic; the right and left directions in each of the embodiments would be the reverse for situations of right-hand traffic.

Further, in the embodiments mentioned above, the radiation optical axis is changed by deflecting the projector lamp constituting the swivel lamp in the lateral direction. However, the present invention may be applied to a structure in which only the reflector is deflected, An auxiliary reflector, which is independently provided from the main reflector, may be deflected.

As described above, in accordance with the present invention, if the turn signal is input from the turn signal switch, when the steering operation is performed in the opposite direction to the direction indicated by the turn signal switch, effective illumination for traffic safety can be carried out by stopping the deflecting operation of the lamp, for example, by fixing the deflecting direction of the lamp in the straight traveling direction. In other words, it is possible to illuminate in front of the vehicle in the traveling direction when the vehicle turns to the left and turns to the right, and it is possible to illuminate in front of the vehicle in the traveling direction just after the vehicle turns to the left and turns to the right. Further, it is possible to illuminate in front of the vehicle in the traveling direction when changing lanes while the vehicle travels at a high speed or low speed. Accordingly, it is possible to suitably light up the AFS, and it is possible to achieve effective illumination in view of traffic safety.

What is claimed is:

1. A method of controlling a vehicular lighting apparatus having a lamp in a front portion of a vehicle, an actuator adapted to deflect a radiation direction of the lamp, a steering angle sensor, a turn signal switch, a traveled distance sensor, and a controller; such method of controlling comprising the steps of:
   activating the actuator based on a deflection control signal;
   the controller providing the deflection control signal to the actuator based on a steering direction detected by the steering angle sensor and a turn signal provided by the turn signal switch, and
   wherein the deflection control signal stops the deflection operation of the lamp if the steering direction is opposite to a direction indicated by the turn signal.

2. The method of controlling a vehicular lighting apparatus according to claim 1, wherein stopping the deflection operation fixes the deflection direction of the lamp in the straight traveling direction of the vehicle until a predetermined time has passed or the vehicle travels for a predetermined distance after the turn signal is cancelled by the steering operation in the opposite direction.

3. The method of controlling a vehicular lighting apparatus according to claim 1, wherein stopping the deflection operation fixes the reflecting direction of the lamp in the straight traveling direction of the vehicle until a predetermined time has passed or the vehicle travels for a predetermined distance after the turn signal is cancelled by the steering operation in the opposite direction.

4. The method of controlling a vehicular lighting apparatus according to claim 1, wherein stopping the deflection operation fixes the deflection direction of the lamp in a straight traveling direction if the turn signal indicates a direction opposite to the opposite lane.

5. The method of controlling a vehicular lighting apparatus according to claim 1, wherein stopping the deflection operation fixes the deflection direction of the lamp in the straight traveling direction of the vehicle until a predetermined time has passed or the vehicle travels for a predetermined distance after the turn signal is cancelled by the steering operation in the opposite direction.

* * * * *